US012459260B2

(12) United States Patent
Yoshino et al.

(10) Patent No.: US 12,459,260 B2
(45) Date of Patent: Nov. 4, 2025

(54) LIQUID DROPLET DISCHARGING HEAD

(71) Applicant: BROTHER KOGYO KABUSHIKI KAISHA, Nagoya (JP)

(72) Inventors: Takaaki Yoshino, Nagoya (JP); Toru Kakiuchi, Chita (JP); Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 203 days.

(21) Appl. No.: 18/527,857

(22) Filed: Dec. 4, 2023

(65) Prior Publication Data

US 2024/0294010 A1 Sep. 5, 2024

(30) Foreign Application Priority Data

Mar. 3, 2023 (JP) ................................ 2023-033136

(51) Int. Cl.
*B41J 2/14* (2006.01)

(52) U.S. Cl.
CPC ....... *B41J 2/14233* (2013.01); *B41J 2/14201* (2013.01); *B41J 2002/14475* (2013.01); *B41J 2202/11* (2013.01)

(58) Field of Classification Search
CPC ................ B41J 2/14233; B41J 2/14201; B41J 2002/14475; B41J 2202/11
See application file for complete search history.

(56) References Cited

U.S. PATENT DOCUMENTS 12,059,895 B2 * 8/2024 Kakiuchi ............ B41J 2/04588

FOREIGN PATENT DOCUMENTS

JP 2009-279865 A 12/2009

* cited by examiner

*Primary Examiner* — Geoffrey S Mruk
(74) *Attorney, Agent, or Firm* — Merchant & Gould P.C.

(57) ABSTRACT

A liquid droplet discharging head includes: a channel member having a channel including a nozzle and a pressure chamber communicating with the nozzle; and a piezoelectric element fixed to the channel member and configured to apply pressure to liquid inside the pressure chamber to discharge liquid droplets of the liquid from the nozzle. A natural frequency Fr of the channel is not less than 250 kHz; and a diameter D [μm] of the nozzle has a relationship of the following expression (1) with the natural frequency Fr [kHz]: $0.0446\times Fr+7.5 \leq 0.0446\times Fr+13.5$ . . . (1).

13 Claims, 7 Drawing Sheets

LIQUID DROPLET DISCHARGING HEAD

REFERENCE TO RELATED APPLICATIONS

This application claims priority from Japanese Patent Application No. 2023-033136 filed on Mar. 3, 2023. The entire content of the priority application is incorporated herein by reference.

BACKGROUND ART

Conventionally, there are known numerical values of a diameter of a nozzle in a case that a recording head (liquid droplet discharging head) is driven at a driving frequency in a range of approximately 25 kHz to 40 kHz.

SUMMARY

In order to perform a high-speed recording, it is considered to increase the driving frequency to be higher. One of the means for increasing the driving frequency is to increase a natural frequency Fr of a channel.

However, in a case that the natural frequency Fr is increased, it is not possible to discharge liquid droplets in an amount sufficient for the recoding, depending on the diameter of the nozzle.

An object of the present disclosure is to provide a liquid droplet discharging head capable of discharging liquid droplets in an amount sufficient for the recording, with a high driving frequency.

According to an aspect of the present disclosure, there is provided a liquid droplet discharging head including: a channel member having a channel including a nozzle and a pressure chamber communicating with the nozzle; and a piezoelectric element fixed to the channel member and configured to apply pressure to liquid inside the pressure chamber to discharge liquid droplets of the liquid from the nozzle, wherein a natural frequency Fr of the channel is not less than 250 kHz; a diameter D [μm] of the nozzle has a relationship of the following expression (1) with the natural frequency Fr [kHz]: $0.0446\times Fr+7.5\ D\ 0.0446\times Fr+13.5$ . . . (1).

DESCRIPTION

First Embodiment

Figure 1:
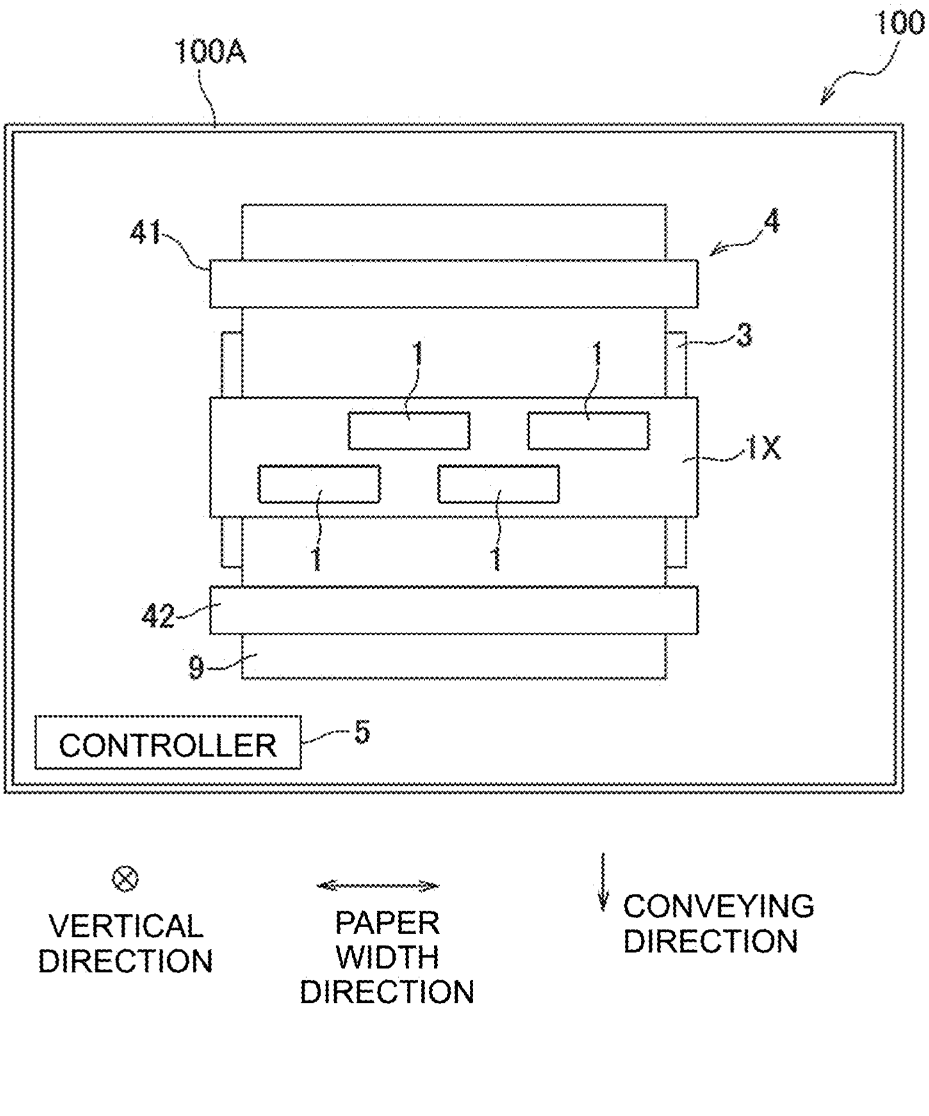
FIG. 1 is a plan view of a printer including a head according to an embodiment of the present disclosure.

A head 1 according to a first embodiment of the present disclosure is included in a printer 100, as depicted in FIG. 1.

The printer 100 is provided with a casing 100A, a head unit 1X, a platen 3, a conveying mechanism 4 and a controller 5. The head unit 1X, the platen 3, the conveying mechanism 4 and the controller 5 are arranged inside the casing 100A.

The printer 100 is further provided with a button arranged on an outer surface of the casing 100A.

A length in a paper width direction of the head unit 1X is longer than a length in a conveying direction of the head unit 1X. The paper width direction is a direction along a width of a paper sheet 9 and is orthogonal to a vertical direction. The conveying direction is orthogonal to the vertical direction and the paper width direction. The head unit 1X is fixed to the casing 100A. The kind of the head unit 1X is a line system.

The head unit 1X includes four heads 1. The four heads 1 are arranged in a staggered manner in the paper width direction. A length in the paper width direction of the head 1 is longer than a length in the conveying direction of the head 1.

The platen 3 is a plate along a plane orthogonal to the vertical direction, and is arranged below the head unit 1X. The paper sheet 9 is supported on an upper surface of the platen 3.

Figure 2:
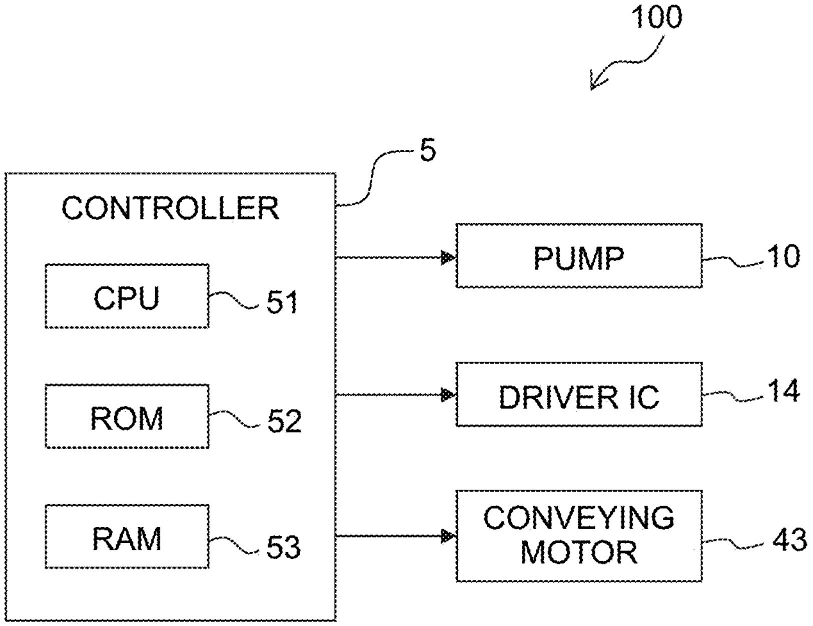
FIG. 2 is a block diagram depicting an electric configuration of the printer.

The conveying mechanism 4 includes a roller pair 41 having two rollers and a roller pair 42 having two rollers, and a conveying motor 43 as depicted in FIG. 2. In the conveying direction, the head unit 1X and the platen 3 are arranged between the roller pairs 41 and 42.

In a case that the conveying motor 43 is driven by a control of the controller 5, the rollers of each of the roller pairs 41 and 42 are rotated. By the rotations of the rollers of each of the roller pairs 41 and 42, the paper sheet 9 held by the rollers of the roller pairs 41 and 42 is conveyed in the conveying direction.

As depicted in FIG. 2, the controller 5 includes a CPU 51, a ROM 52 and a RAM 53.

The CPU 51 executes a variety of kinds of control based on data inputted from an external apparatus or the above-described button, and in accordance with programs and data stored in the ROM 52 and/or the RAM 53. The external apparatus is, for example, a personal computer (PC).

The ROM 52 stores the programs and the data with which the CPU 51 performs the variety of kinds of control. The RAM 53 temporarily stores data used by the CPU 51 in a case that the CPU 51 executes the programs.

Next, the configuration of the head 1 will be explained.

Figure 4:
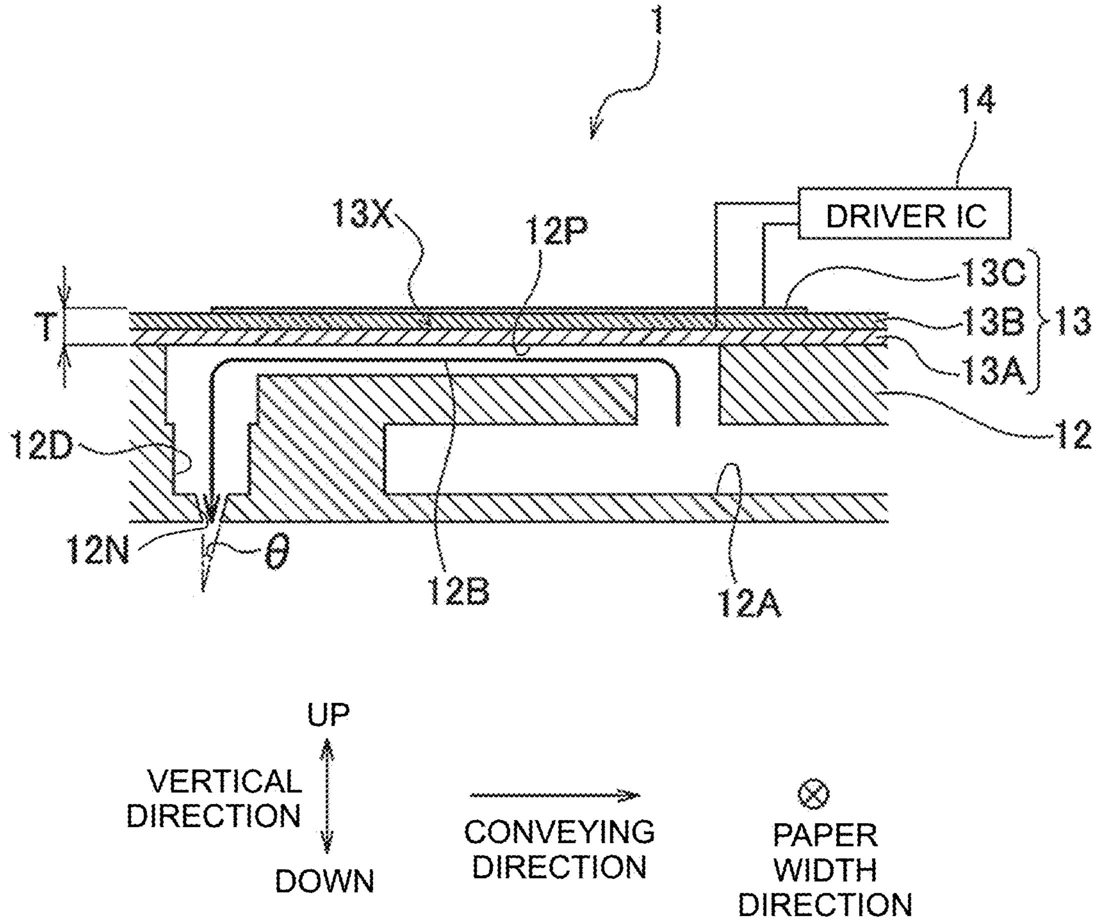
FIG. 4 is a cross-sectional view of the head taken along a IV-IV line of FIG. 3.

As depicted in FIG. 4, the head 1 includes a channel member 12 and an actuator member 13.

Figure 3:
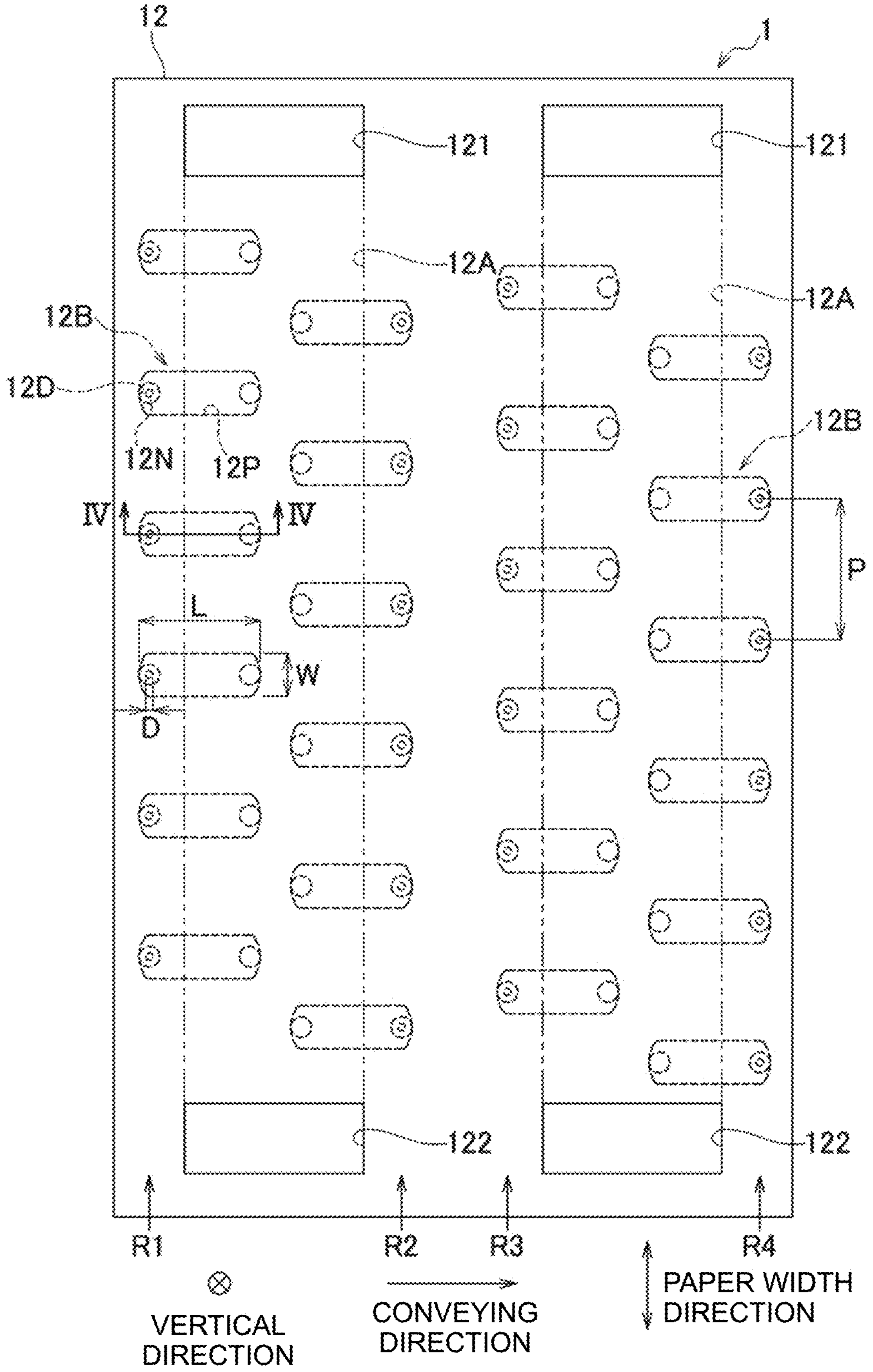
FIG. 3 is a plan view of the head.

As depicted in FIG. 3, two supply ports 121 and two return ports 122 are opened in an upper surface of the channel member 12. The two supply ports 121 are arranged on one end in the paper width direction of the channel member 12. The two return ports 122 are arranged on the other end in the paper width direction of the channel member 12. The supply ports 121 and the return ports 122 communicate with an ink tank via tubes.

The channel member 12 has two common channels 12A and a plurality of individual channels 12B.

The two common channels 12A are arranged side by side in the conveying direction and each extend in the paper width direction. Each of the two supply ports 121 is connected to one end in the paper width direction of one of the two common channels 12A, and each of the two return ports 122 is connected to the other end in the paper width direction of one of the two common channels 12A. The common channels 12A communicate with the ink tank via the supply ports 121 and the return ports 122, and communicate with the individual channels 12B.

Each of the individual channels 12B includes a nozzle 12N, a pressure chamber 12P communicating with the nozzle 12N and a connecting channel 12D connecting the nozzle 12N and the pressure chamber 12P. The individual channel 12B corresponds to a "channel" of the present disclosure.

A plurality of pieces of the nozzle 12N is opened in a lower surface of the channel member 12, and a plurality of pieces of the pressure chamber 12P is opened in the upper surface of the channel member 12. An opening of the nozzle 12N is circular, and an opening of the pressure chamber 12P is substantially rectangular.

The nozzle 12N of the present embodiment is defined by a metallic member, and is formed by a laser processing or a punching processing. For example, the channel member 12 includes a plurality of plates. Among the plurality of plates, a plate having the nozzle 12N is a metallic plate.

A width W of the pressure chamber 12P is not more than 300 μm. A length L of the pressure chamber 12P is not more than 350 μm. The width W is a length in the paper width direction, and the length L is a length in the conveying direction. For example, the width W of the pressure chamber 12P is 225 μm. The length L of the pressure chamber 12P is, for example, 330 μm.

As depicted in FIG. 3, the nozzles 12N are arranged in a staggered manner in the paper width direction and construct four nozzle rows R1 to R4. Each of the nozzle rows R1 to R4 is constructed of the nozzles 12N which are aligned in the paper width direction.

In each of the nozzle rows R1 to R4, the nozzles 12N are arranged in the paper width direction at a pitch P which is not less than 300 dpi. In the present embodiment, a recording resolution in each of the nozzle rows R1 to R4 is 300 dpi, and the pitch P is approximately 84 m. The term "recording resolution" means a resolution of an image which is to be recorded by droplets of the ink (ink droplets) discharged from the nozzles 12N.

In two nozzles rows, among the four nozzle rows R1 to R4, which are adjacent to each other in the conveying direction, the positions of the nozzles 12N in the paper width direction are shifted by half the pitch P. With this, in a case that the recording resolution in each of the nozzle rows R1 to R4 is 300 dpi, a recording resolution of 1200 dpi is realized by the four nozzle rows R1 to R4. The head 1 of the present embodiment has a recording resolution of 1200 dpi×1200 dpi in the paper width direction and the conveying direction.

As depicted in FIG. 4, the nozzle 12N has a tapered shape toward the lower side. A lower end of the nozzle 12N is an opening of the nozzle 12N, and has a diameter smaller than that of an upper end of the nozzle 12N. In the present embodiment, a side wall defining the nozzle 12N is inclined with respect to the vertical direction. A taper angle θ of the nozzle 12N is an angle, of the side wall defining the nozzle 12N, on a side of the acute angle with respect to the vertical direction. The taper angle θ of the nozzle 12N exceeds 35° and is less than 45°.

As depicted in FIG. 4, the connecting channel 12D connects an end in the conveying direction of the pressure chamber 12P and the upper end of the nozzle 12N. The connecting channel 12D has a columnar shape, and has a diameter greater than the diameter of the upper end of the nozzle 12N.

In a case that the pump 10 as depicted in FIG. 2 is driven by a control of the controller 5, the ink inside the ink tank is supplied to the common channels 12A via the supply ports 121, and is distributed from the common channels 12A to the individual channels 12B.

In each of the individual channels 12B, in a case that a piezoelectric element 13X (to be described later on) is driven so as to reduce the volume of the pressure chamber 12P and to apply pressure to the ink inside the pressure chamber 12P, the ink inside the pressure chamber 12P passes through the connecting channel 12D and is discharged from the nozzle 12N as an ink droplet.

The ink supplied from the supply ports 121 moves inside the common channels 12A from one ends toward the other ends in the paper width direction thereof and reaches the return ports 122. The ink reached the return ports 122 is returned to the ink tank via the tubes.

As depicted in FIG. 4, the actuator member 13 is fixed to the upper surface of the channel member 12. The actuator member 13 includes a vibration plate 13A made of metal, a piezoelectric layer 13B and a plurality of individual electrodes 13C.

A part in the actuator member 13 which overlaps with each of the pressure chambers 12P in the vertical direction functions as a piezoelectric element 13X. The piezoelectric element 13X is independently deformable in accordance with a potential applied to one of the individual electrodes 13C corresponding thereto.

The piezoelectric element 13X is a thin film piezoelectric element. The term "thin film piezoelectric element" is so-called micro electro mechanical systems (MEMS). The piezoelectric element 13X is formed by performing film formation sequentially, on the upper surface of the vibration plate 13A, of a thin film which is to be the piezoelectric layer 13B and a thin film which is to be the individual electrodes 13C. A thickness T of the thin film piezoelectric element is not more than 5 μm. For example, the thickness T is 3 μm.

The vibration plate 13A is arranged on the upper surface of the channel member 12 so as to cover the pressure chambers 12P. The piezoelectric layer 13B is arranged on the upper surface of the vibration plate 13A. The individual electrodes 13C are arranged on the upper surface of the piezoelectric layer 13B so as to overlap with the pressure chambers 12P respectively in the vertical direction.

The vibration plate 13A and the individual electrodes 13C are electrically connected to a driver IC 14. The driver IC 14 maintains a potential of the vibration plate 13A at ground potential, whereas the driver IC 14 changes the potential of each of the individual electrodes 13C. The vibration plate 13A functions as a common electrode which is an electrode common to the piezoelectric elements 13X.

The driver IC 14 generates a driving signal based on a control signal from the controller 5 and supplies the driving signal to each of the individual electrodes 13C. The driving signal changes the potential of each of the individual electrodes 13C between a predetermined driving potential and the ground potential.

Next, an analysis performed by the inventors of the present disclosure will be explained.

<First Analysis>

Figure 5:
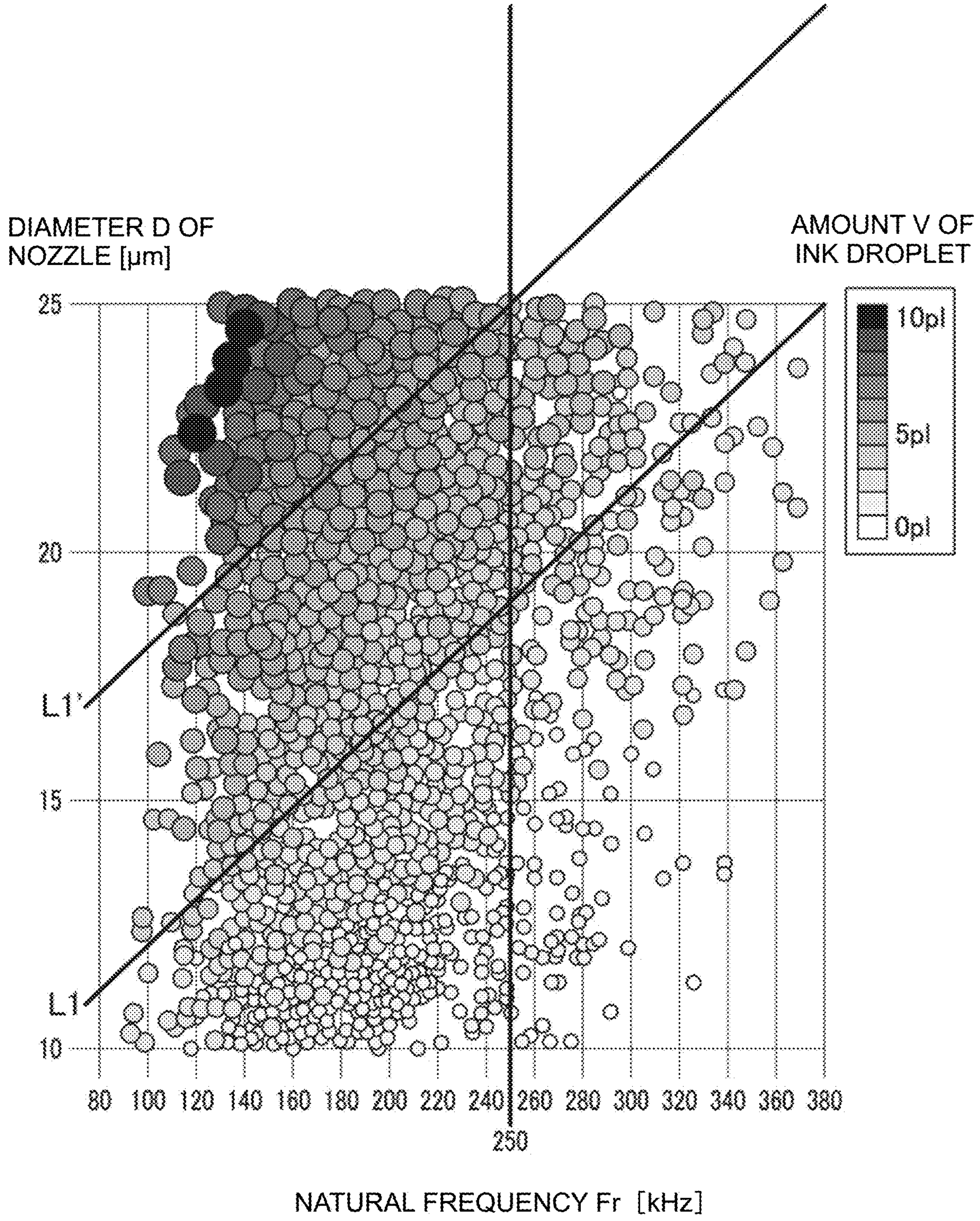
FIG. 5 is a graph indicating a relationship among a diameter D of a nozzle, a natural frequency Fr of an individual channel and an amount V of an ink droplet.

Regarding first analytic models of a plurality of heads 1, the inventors of the present disclosure obtained a natural frequency Fr of the individual channel 12B and an amount V of an ink droplet. The heads 1 were mutually different in the diameter D of the nozzle 12N, the width W of the pressure chamber 12P and the length L of the pressure chamber 12P. FIG. 5 indicates a result of the analysis. In the first analytic models, the configuration of the individual channel 12B, except for the width W of the pressure chamber 12P, the length L of the pressure chamber 12P and the diameter D of the nozzle 12N is mutually same. The diameter D is a diameter of the opening of the nozzle 12N.

The width W of the pressure chamber 12P, the length L of the pressure chamber 12P and the diameter D of the nozzle 12N affect the natural frequency Fr. Accordingly, in the first analytic models, there are various natural frequencies Fr.

FIG. 5 is a graph in which the amount V of the ink droplet discharged by applying the driving signal to the piezoelectric element 13X in each of the first analytic models is plotted in a gray scale. Note that in the first analytic models, the driving potential was adjusted so that a discharging velocity of the ink droplet became same among the first analytic models.

A pulse width of a pulse included in the driving signal is equal to an Acoustic Length (AL). The term "AL" is one way propagation time of pressure wave in the individual channel 12B. Since the first analytic models are mutually different in the configuration of the individual channel 12B, the ALs are mutually different among the first analytic models. Therefore, the pulse widths were different among the first analytic models.

It is appreciated from FIG. 5 that as the natural frequency Fr is higher, the amount V of the ink droplet is smaller. Further, it is also appreciated that as the diameter D of the nozzle 12N is smaller, the amount V of the ink droplet is smaller.

In the present embodiment, the recording resolution is made to be not less than 1200 dpi. In order to record an image of satisfactory quality in this recording resolution, it is required to discharge an ink droplet of which amount is in a range of 3.5 pl to 4.5 pl from the nozzle 12N.

In FIG. 5, an area above a straight line L1 of "D=0.0446×Fr+7.5" is a range in which the amount V of the ink droplet is not less than 3.5 pl. An area below a straight line L1' of "D=0.0446×Fr+13.5" is a range in which the amount V of the ink droplet is not more than 4.5 pl. Accordingly, by allowing the diameter D of the nozzle 12N to have a relationship of the following expression (1) with the natural frequency Fr, it is possible to discharge the ink droplet in an amount which is sufficient for the recording.

$$0.0446 \times Fr + 7.5 \leq D \leq 0.0446 \times Fr + 13.5. \tag{1}$$

In the present embodiment, the natural frequency Fr is not less than 250 kHz in order to increase the driving frequency. Further, in order to prevent a problem which is due to a situation that the rigidity of the piezoelectric element 13X is great, as will be described later on, the natural frequency Fr is preferably not more than 300 kHz.

<Second Analysis>

Figure 6:
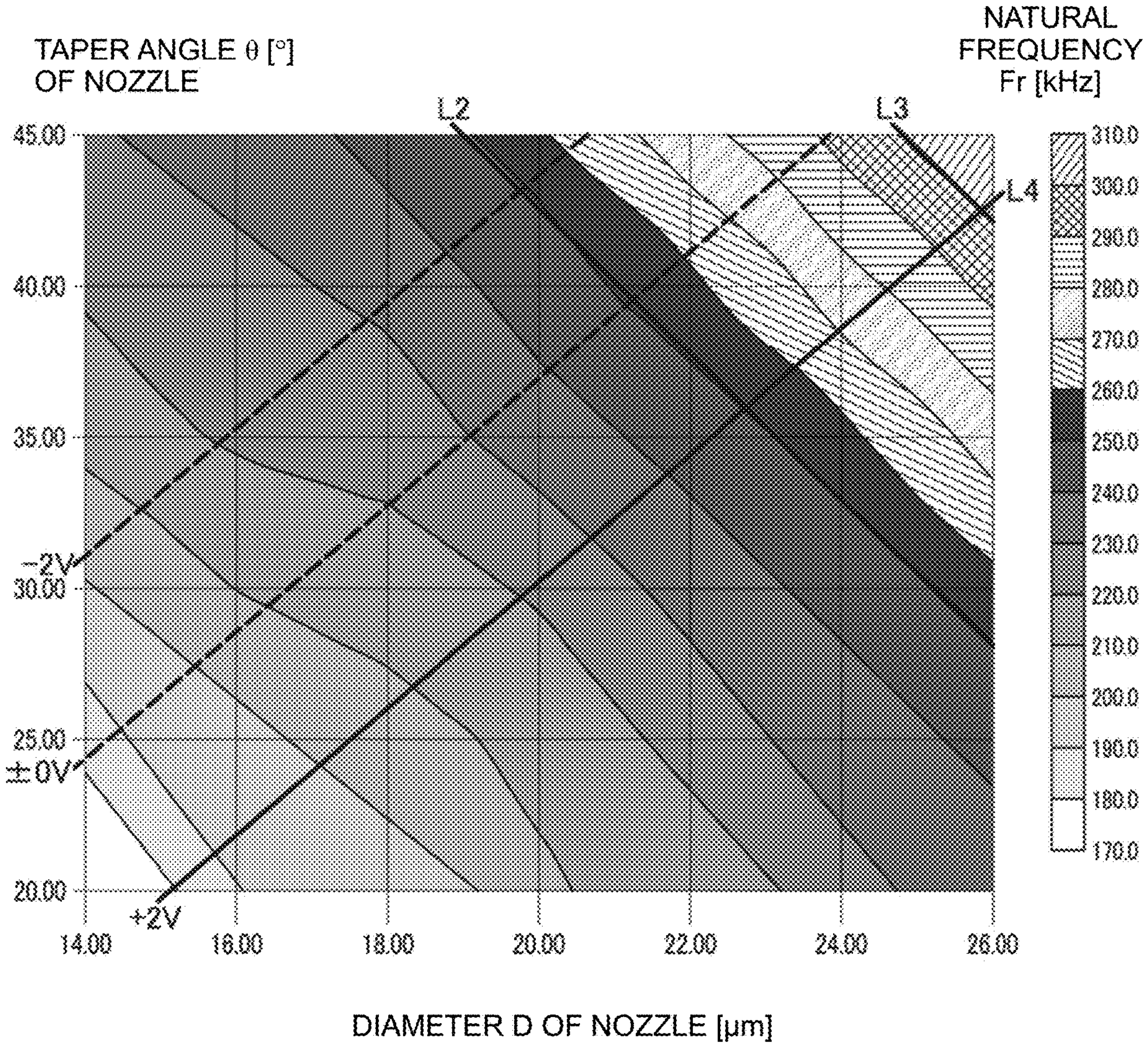
FIG. 6 is a graph indicating a relationship among the diameter D of the nozzle, a taper angle θ of the nozzle and the natural frequency Fr of the individual channel.

Further, regarding second analytic models of a plurality of heads 1, the inventors of the present disclosure obtained the natural frequency Fr. The heads 1 were mutually different in the diameter D and the taper angle θ of the nozzle 12N. FIG. 6 indicates a result of the analysis. In the second analytic models, the configuration of the individual channel 12B, except for the diameter D and the taper angle θ of the nozzle 12N, is mutually same among the second analytic models.

The diameter D and the taper angle θ of the nozzle 12N affect the natural frequency Fr. Accordingly, in the second analytic models, there are various natural frequencies Fr.

In FIG. 6, an area above a straight line L2 of "θ=−2.2×D+87.2" is a range in which the natural frequency Fr is not less than 250 kHz. Accordingly, in a case that the taper angle θ [° ] of the nozzle 12N has a relationship of the following expression (2) with the diameter D [μm] of the nozzle 12N, the natural frequency Fr is not less than 250 kHz.

$$\theta \geq -2.2 \times D + 87.2. \tag{2}$$

In FIG. 6, an area below a straight line L3 of "θ=−2.2×D+116.6" is a range in which the natural frequency Fr is not more than 300 kHz. Accordingly, in a case that the taper angle θ [° ] of the nozzle 12N has a relationship of the following expression (3) with the diameter D [μm] of the nozzle 12N, the natural frequency Fr is not more than 300 kHz.

$$\theta \leq -2.2 \times D + 116.6. \tag{3}$$

In FIG. 6, a broken line of "±0V" is a relational expression between the diameter D of the nozzle 12N and the taper angle θ of the nozzle 12N in which the driving voltage to be applied to the piezoelectric element 13X so as to discharge a predetermined amount of the ink droplet from the nozzle 12N becomes a reference voltage (for example, 20V). A broken line of "−2V" is a relational expression between the diameter D of the nozzle 12N and the taper angle θ of the nozzle 12N in which the driving voltage to be applied to the piezoelectric element 13X so as to discharge the predetermined amount of the ink droplet from the nozzle 12N becomes lower by 2V (for example, 18V) than the reference voltage. A solid line of "+2V" is a relational expression between the diameter D of the nozzle 12N and the taper angle θ of the nozzle 12N in which the driving voltage to be applied to the piezoelectric element 13X so as to discharge the predetermined amount of the ink droplet from the nozzle 12N becomes higher by 2V (for example, 22V) than the reference voltage.

The solid line of "+2V" is equal to a straight line L4 of "θ=2.1×D−12.8". An area above the straight line L4 is a range in which an increase amount, of the driving voltage to be applied to the piezoelectric element 13X, from the reference voltage becomes not more than 2V Accordingly, in a case that the taper angle θ [° ] of the nozzle 12N has a relationship of the following expression (4) with the diameter D [μm] of the nozzle 12N, it is possible to make the increase amount, of the driving voltage to be applied to the piezoelectric element 13X, from the reference voltage to be not more than 2V $$\theta \geq 2.1 \times D - 12.8. \tag{4}$$

As described above, according to the present embodiment, since the natural frequency Fr is not less than 250 kHz, it is possible to increase the driving frequency. Further, by allowing the diameter D of the nozzle 12N to have the relationship of the following expression (1) with the natural frequency Fr, it is possible to discharge the ink droplet in the amount which is sufficient for the recording, as the result of the analysis indicated in FIG. 5.

$$0.0446\times Fr+7.5\leq D\leq 0.0446\times Fr+13.5. \tag{1}$$

The taper angle θ [° ] of the nozzle 12N has the relationship of the following expression (2) with the diameter D [μm] of the nozzle 12N. In this case, as the result of the analysis indicated in FIG. 6, it is possible to realize the requirement that the natural frequency Fr is not less than 250 kHz, in a more ensured manner.

$$\theta\geq -2.2\times D+87.2. \tag{2}$$

The natural frequency Fr is not more than 300 kHz. In a case that the natural frequency Fr exceeds 300 kHz, since the rigidity of the piezoelectric element 13X is great, it is necessary to make the driving voltage to be applied to the piezoelectric element 13X so as to deform the piezoelectric element 13X to be great. This consequently makes the heat value of the piezoelectric element 13X great and allows the heat of the piezoelectric elements 13X to be transferred to the ink inside the individual channel 12B, which in turn lowers the viscosity of the ink. In this case, due to the viscosity of the ink which becomes lower than a predetermined viscosity, the size of the ink droplet discharged from the nozzle 12N becomes greater than a predetermined size. As a result, the density of an image formed by the ink droplets discharged from the nozzles 12N becomes higher than a predetermined density. In view of this point, the natural frequency Fr in the present embodiment is not more than 300 kHz, and thus there is no need to make the driving voltage to be applied to the piezoelectric element 13X great, thereby preventing the inconvenience as described above from occurring.

The taper angle θ [° ] of the nozzle 12N has the relationship of the following expression (3) with the diameter D [μm] of the nozzle 12N. In this case, as the result of the analysis indicated in FIG. 6, it is possible to realize the requirement that the natural frequency Fr is not more than 300 kHz, in a more ensured manner.

$$\theta\leq -2.2\times D+116.6. \tag{3}$$

The taper angle θ [° ] of the nozzle 12N has the relationship of the following expression (4) with the diameter D [μm] of the nozzle 12N. In this case, as the result of the analysis indicated in FIG. 6, the driving voltage to be applied to the piezoelectric element 13X does not become great. Provided that the driving voltage to be applied to the piezoelectric element 13X becomes great, the heat value of the piezoelectric element 13X becomes great and allows the heat of the piezoelectric elements 13X to be transferred to the ink inside the individual channel 12B, which in turn lowers the viscosity of the ink. In such a case, due to the viscosity of the ink which becomes lower than the predetermined viscosity, the size of the liquid droplet discharged from the nozzle 12N becomes greater than a predetermined size. As a result, the density of an image formed by the ink droplets discharged from the nozzles 12N becomes higher than a predetermined density. In view of this point, in the present embodiment, the driving voltage to be applied to the piezoelectric element 13X does not become great as the result of the analysis indicated in FIG. 6, thereby preventing the inconvenience as described above from occurring which would be otherwise occurred in a case that the driving voltage is great.

$$\theta\geq 2.1\times D-12.8. \tag{4}$$

The piezoelectric element 13X is the thin film piezoelectric element. Since the thickness T of the thin film piezoelectric element is small, the thin film piezoelectric element is easily deformed and is sufficiently deformable even in the case that the size of the pressure chamber 12P is small. Accordingly, in the case that the piezoelectric element 13X is the thin film piezoelectric element, it is possible to satisfy the requirement that the natural frequency Fr is not less than 250 kHz by making the size of the pressure chamber 12P small to thereby increasing the natural frequency Fr. Further, it is also possible to make the piezoelectric element 13X sufficiently deformable with small driving voltage.

The thickness T of the thin film piezoelectric element is not more than 5 μm. In this case, it is possible to realize the effect obtained by the thin film piezoelectric element as described above, in a more ensured manner.

The width W of the pressure chamber 12P is not more than 300 μm. In this case, since the size of the pressure chamber 12P is small, the rigidity of the pressure chamber 12P becomes great and the natural frequency Fr becomes high. As a result, it is possible to satisfy the requirement that the natural frequency Fr is not less than 250 kHz, in more ensured manner.

The length L of the pressure chamber 12P is not more than 350 μm. In this case, since the size of the pressure chamber 12P is small, the rigidity of the pressure chamber 12P becomes great and the natural frequency Fr becomes high. As a result, it is possible to satisfy the requirement that the natural frequency Fr is not less than 250 kHz, in more ensured manner.

The taper angle θ is less than 45°. In a case that the taper angle θ is not less than 45°, the inclination of the side wall defining the nozzle 12N becomes too great, and thus a meniscus at the opening of the nozzle 12N moves toward the upper end of the nozzle 12N, which in turn makes the meniscus to be easily broken. In view of this, since the taper angle θ in the present embodiment is less than 45°, the meniscus at the opening of the nozzle 12N is less likely to move toward the upper end of the nozzle 12N, which in turn makes the meniscus less likely to be broken.

The taper angle θ exceeds 35°. In a case that the taper angle θ is not more than 35°, a cross-sectional area of the individual channel 12B changes abruptly at a boundary part between the connecting channel 12D and the nozzle 12N. Accordingly, the pressure drop from the connecting channel 12D and up to the nozzle 12N becomes great, which in turn makes it necessary to make the driving voltage to be applied to the piezoelectric element 13X so as to discharge the predetermined amount of the ink droplet from the nozzle 12N great. In view of this point, in the present embodiment, since the taper angle θ exceeds 35°, a change amount of the cross-sectional area at the above-described boundary part becomes small, thereby making it possible to make the driving voltage to be applied to the piezoelectric element 13X small.

The recording resolution is not less than 1200 dpi. In this case, it is possible to realize a high image quality. Further, in this recording resolution, by allowing the diameter D of the nozzle 12N to have the relationship of the above-described expression (1) with the natural frequency Fr, it is possible to discharge the liquid droplet in the amount sufficient for the recoding.

Second Embodiment

Figure 7:
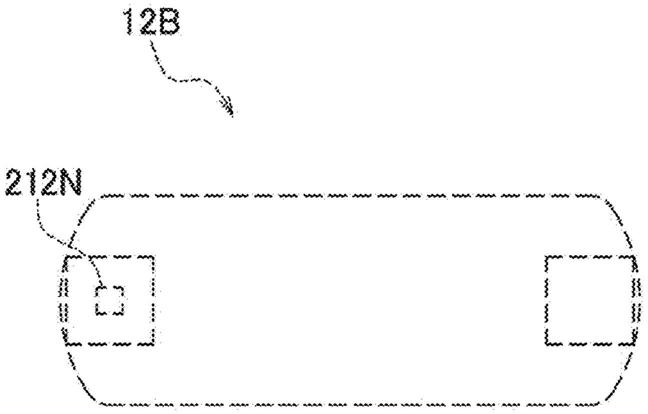
FIG. 7 is a plan view depicting an individual channel of a head according to another embodiment of the present disclosure.

In the first embodiment, the opening of the nozzle 12N is circular, as depicted in FIG. 3. In contrast, in a second embodiment, the opening of a nozzle 212N has a rectangular shape, as depicted in FIG. 7. In a case that the opening of the nozzle 212N is rectangular, the diameter of a circle having an area same as an area of this rectangular shape is made to be a diameter D of the nozzle.

The nozzle 12N of the first embodiment is defined by the metallic member and is formed by the laser processing or the punching processing. In contrast, the nozzle 212N of the second embodiment is defined by a silicon member and is formed by an etching processing. For example, the channel member 12 includes a plurality of plates. A plate, of the plurality of plates, which has the nozzle 212N is a silicon plate.

In a case that the nozzle is formed by the laser processing or the punching processing, the accuracy of processing is higher with the opening of the nozzle 12N which is circular as depicted in FIG. 3, than the opening of the nozzle 212N which is rectangular as depicted in FIG. 7. On the other hand, in a case that the nozzle is formed by the etching processing, the accuracy of processing is higher with the opening of the nozzle 212N which is rectangular as depicted in FIG. 7, than the opening of the nozzle 12N which is circular as depicted in FIG. 3.

Owing to the high accuracy of processing, it is possible to make the diameter D of the nozzle 212N to be a desired value. Further, there is no variation in the diameter D among the plurality of nozzles 212N.

<Modifications>

Although the embodiments of the present disclosure have been explained above, the present disclosure is not limited to or restricted by the above-described embodiments, and various design changes can be made within the scope of the claims.

In the above-described embodiments, although the electrode constructing the piezoelectric element has a two-layered structure including the individual electrode and the common electrode, the electrode may have a three-layered structure. The term "three-layered structure" means, for example, a structure including a driving electrode to which a high potential and a low potential are selectively applied, a high potential electrode maintained at the high potential and a low potential electrode maintained at the low potential.

The kind of the liquid droplet discharging head of the present disclosure is not limited to the line system, and the kind may be a serial system.

The object to which the liquid droplet is to be discharged is not limited to the paper sheet, and may be, for example, cloth (fabric), a substrate or a plastic member, etc.

The liquid droplet discharged from the nozzle is not limited to the ink droplet. For example, the liquid droplet may be a liquid droplet of treatment liquid which agglutinates or precipitates a component in the ink.

The present disclosure is not limited to being applicable to the printer, and is applicable also to facsimiles, copy machines, multifunction peripherals, etc. Further, the present disclosure is applicable also to a liquid droplet discharging apparatus used for any other application than the recording of an image. For example, the present disclosure is applicable to a liquid droplet discharging apparatus which forms an electroconductive pattern by discharging electroconductive liquid on a substrate.

What is claimed is:

1. A liquid droplet discharging head, comprising:

a channel member having a channel including a nozzle and a pressure chamber communicating with the nozzle; and a piezoelectric element fixed to the channel member and configured to apply pressure to liquid inside the pressure chamber to discharge liquid droplets of the liquid from the nozzle, wherein a natural frequency Fr of the channel is not less than 250 kHz, and a diameter D [μm] of the nozzle has a relationship of the following expression (1) with the natural frequency Fr [kHz]:

$$0.0446 \times Fr + 7.5 \le D \le 0.0446 \times Fr + 13.5. \quad (1)$$

2. The liquid droplet discharging head according to claim 1, wherein a taper angle θ [° ] of the nozzle has a relationship of the following expression (2) with the diameter D [μm] of the nozzle:

$$\theta \ge -2.2 \times D + 87.2. \quad (2)$$

3. The liquid droplet discharging head according to claim 1, wherein the natural frequency Fr is not more than 300 kHz.

4. The liquid droplet discharging head according to claim 3, wherein a taper angle θ [° ] of the nozzle has a relationship of the following expression (3) with the diameter D [μm] of the nozzle:

$$\theta \le -2.2 \times D + 116.6. \quad (3)$$

5. The liquid droplet discharging head according to claim 1, wherein a taper angle θ [° ] of the nozzle has a relationship of the following expression (4) with the diameter D [μm] of the nozzle:

$$\theta \ge 2.1 \times D - 12.8. \quad (4)$$

6. The liquid droplet discharging head according to claim 1, wherein the piezoelectric element is a thin film piezoelectric element.

7. The liquid droplet discharging head according to claim 6, wherein a thickness of the thin film piezoelectric element is not more than 5 μm.

8. The liquid droplet discharging head according to claim 1, wherein the nozzle is defined by a silicon member and has a rectangular opening.

9. The liquid droplet discharging head according to claim 1, wherein a width of the pressure chamber is not more than 300 μm.

10. The liquid droplet discharging head according to claim 1, wherein a length of the pressure chamber is not more than 350 μm.

11. The liquid droplet discharging head according to claim 1, wherein a taper angle θ [° ] of the nozzle is less than 45°.

12. The liquid droplet discharging head according to claim 1, wherein a taper angle θ [° ] of the nozzle exceeds 35°.

13. The liquid droplet discharging head according to claim 1, wherein a recording resolution which is a resolution of an image to be recorded by the liquid droplets is not less than 1200 dpi.

* * * * *